No. 765,079.

Patented July 12, 1904.

UNITED STATES PATENT OFFICE.

PAUL JULIUS AND CARL WINTER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

RED AZO COLOR.

SPECIFICATION forming part of Letters Patent No. 765,079, dated July 12, 1904.

Application filed April 12, 1904. Serial No. 202,880. (No specimens.)

*To all whom it may concern:*

Be it known that we, PAUL JULIUS, a subject of the Emperor of Austria-Hungary, and CARL WINTER, a subject of the King of Prussia, German Emperor, both doctors of philosophy and chemists, residing at Ludwigshafen-on-the-Rhine, in the Kingdom of Bavaria, German Empire, have invented new and useful Improvements in Azo Coloring-Matter, of which the following is a specification.

We have discovered that by combining diazotized ortho-chlor-para-toluidin with beta-naphthol-3.6-disulfo-acid a red coloring-matter is obtained which is eminently suitable for the preparation of lakes which possess an excellent fastness against the action of light.

The following is an example of the manner in which the said coloring-matter can be prepared; but our invention is not limited to this particular example. The parts are by weight: Diazotize one hundred and forty-one and a half (141.5) parts of ortho-chlor-para-toluidin and allow the solution of the diazo compound to flow into a solution of three hundred and fifty (350) parts of the sodium salt of beta-naphthol-3.6-disulfo-acid to which the requisite quantity of soda solution has been added. Stir for half ($\frac{1}{2}$) an hour and then heat the solution to a temperature of about sixty degrees centigrade, (60° C.) Complete the precipitation of the coloring-matter by means of common salt and filter, press, and dry.

Our new coloring-matter, which is thus obtained in the form of its sodium salt, is brilliant red and difficultly soluble in cold water, but easily soluble in hot water. Its barium lake is also brilliant red and practically insoluble in water. Upon reduction with zinc-dust in solutions containing ammonia our coloring-matter yields ortho-chlor-para-toluidin and amido-naphthol-disulfo-acid.

What we claim is—

The new azo coloring-matter such as can be obtained by combining diazotized ortho-chlor-para-toluidin with 2-naphthol-3.6-disulfo-acid, which coloring-matter in the form of its sodium salt is brilliant red, and is difficultly soluble in cold water, but easily soluble in hot water, which in the form of its barium lake is brilliant red and practically insoluble in water, and which upon reduction with zinc-dust in solutions containing ammonia yields ortho-chlor-para-toluidin and amido-naphthol-disulfo-acid.

In testimony whereof we have hereunto set our hands in the presence of two subscribing witnesses.

PAUL JULIUS.
CARL WINTER.

Witnesses:
ERNEST F. EHRHARDT,
J. ALEC. LLOYD.